US010583835B2

(12) United States Patent
Ediger et al.

(10) Patent No.: US 10,583,835 B2
(45) Date of Patent: Mar. 10, 2020

(54) METHOD FOR AUTOMATICALLY ADAPTING ACCELERATION IN A MOTOR VEHICLE

(71) Applicant: FORD GLOBAL TECHNOLOGIES, LLC, Dearborn, MI (US)

(72) Inventors: Andreas Ediger, Cologne (DE); Benjamin Baecker, Cologne (DE); Stephanie Rosenberg, Huerth (DE); Benjamin Carl Mukkala, II, Ann Arbor, MI (US); Aaron L. Mills, Ann Arbor, MI (US); Manuel Strauch, Langerwehe (DE)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 15/266,354

(22) Filed: Sep. 15, 2016

(65) Prior Publication Data
US 2017/0072955 A1 Mar. 16, 2017

(30) Foreign Application Priority Data

Sep. 15, 2015 (DE) .................. 10 2015 217 577

(51) Int. Cl.
B60W 30/16 (2020.01)
B60W 50/00 (2006.01)
G08G 1/0967 (2006.01)

(52) U.S. Cl.
CPC .......... B60W 30/162 (2013.01); B60W 30/16 (2013.01); B60W 50/0097 (2013.01);
(Continued)

(58) Field of Classification Search
CPC .............. B60W 30/162; B60W 30/16; B60W 50/0097; B60W 2050/0089;
(Continued)

(56) References Cited

U.S. PATENT DOCUMENTS 6,374,174 B2 * 4/2002 Hellmann .......... B60K 31/0008
701/93
8,036,803 B2 * 10/2011 Michi ................ B60K 31/0008
701/93
(Continued)

FOREIGN PATENT DOCUMENTS

DE 10303010 A1 8/2004
DE 102007005245 A1 11/2007
(Continued)

OTHER PUBLICATIONS

Protzel, et al., Generating Fuzzy Rules for the Acceleration Control of an Adaptive Cruise Control System, 1996, IEEE, p. 451-455 (Year: 1996).*
(Continued)

Primary Examiner — McDieunel Marc
(74) Attorney, Agent, or Firm — Frank Lollo; Brooks Kushman P.C.

(57) ABSTRACT

A method for controlling a vehicle includes automatically adapting vehicle acceleration responsive to a cruise control setpoint acceleration associated with a detected speed limit, and a drive setpoint acceleration based on the cruise control setpoint acceleration, wherein a cruise controller determines a distance control setpoint acceleration based on a detected vehicle distance from a vehicle traveling ahead, and wherein the drive setpoint acceleration is limited by the distance control setpoint acceleration.

20 Claims, 5 Drawing Sheets

(52) U.S. Cl.
CPC ............... *G08G 1/096725* (2013.01); *B60W 2050/0089* (2013.01); *B60W 2300/14* (2013.01); *B60W 2420/403* (2013.01); *B60W 2420/42* (2013.01); *B60W 2550/22* (2013.01); *B60W 2550/308* (2013.01); *B60W 2550/402* (2013.01); *B60W 2550/404* (2013.01); *B60W 2550/408* (2013.01); *B60W 2720/106* (2013.01)

(58) Field of Classification Search
CPC ....... B60W 2300/14; B60W 2420/403; B60W 2420/42; B60W 2550/22; B60W 2550/308; B60W 2550/402; B60W 2550/404; B60W 2550/408; B60W 2720/106; G08G 1/096725
USPC .......................................................... 701/96
See application file for complete search history.

(56) References Cited

U.S. PATENT DOCUMENTS

| | | | |
|---|---|---|---|
| 8,359,149 B2* | 1/2013 | Shin | B60W 30/16 701/93 |
| 8,768,535 B2 | 7/2014 | Kossira et al. | |
| 9,114,809 B2* | 8/2015 | Huang | B60W 30/143 |
| 9,430,944 B2* | 8/2016 | Grimm | H04L 67/22 |
| 9,475,500 B2* | 10/2016 | Grimm | B60W 40/068 |
| 2008/0254937 A1* | 10/2008 | Makiyama | F16H 61/0213 477/47 |
| 2009/0321229 A1* | 12/2009 | Haug | B60K 31/042 200/61.27 |
| 2011/0106364 A1* | 5/2011 | Braeuchle | B60K 31/0008 701/31.4 |
| 2012/0253628 A1 | 10/2012 | Maruyama | |
| 2014/0244130 A1* | 8/2014 | Filev | B60K 31/00 701/96 |
| 2015/0134224 A1* | 5/2015 | Vaughan | B60W 10/06 701/93 |
| 2017/0259822 A1* | 9/2017 | Schubert | B60W 30/17 |

FOREIGN PATENT DOCUMENTS

| | | |
|---|---|---|
| DE | 102011053778 A1 | 4/2012 |
| DE | 102013224716 A1 | 6/2015 |
| EP | 1930863 A2 | 6/2008 |
| EP | 2803521 A2 | 11/2014 |
| WO | 2015047177 A1 | 4/2015 |

OTHER PUBLICATIONS

Ploeg et al., Design and Experimental Evaluation of Cooperative Adaptive Cruise Control, 2011, IEEE, p. 260-265 (Year: 211).*

Schmied et al., Extension and Experimental Validation of Fuel Efficient Predictive Adaptive Cruise Control, 2015, IEEE, p. 4753-4758 (Year: 2015).*

Benalie et al., Improvement of Adaptive Cruise Control System based on Speed Characteristics and Time Headway, 2009, IEEE, p. 2403-2408 (Year: 2009).*

Knauder et al. Predictive longitudinal vehicle control based on vehicle-to-infrastructure communication, 2014, IEEE, p. 258-263 (Year: 2014).*

McDonough et al., Transition Threshold Optimization for a Rule Based Automotive Cruise Control, 2014, IEEE, p. 4101-4106 (Year: 2014).*

Park et al., A Driving Simulator Study on Adaptive Cruise Control Failure, 2006, IEEE, p. 2138-2141 (Year: 2006).*

Saffarian et al., Enhancing Driver Car-Following Performance with a Distance and Acceleration Display, 2012, IEEE, p. 8-16 (Year: 2012).*

German Search Report for German Application No. 10 2015 217 577.4 dated Jun. 20, 2016.

European Search Report for European Application No. EP 16186269 dated Jan. 27, 2017.

German Examination Report for German Application No. DE 102015217577.4 dated Jun. 20, 2016.

* cited by examiner

METHOD FOR AUTOMATICALLY ADAPTING ACCELERATION IN A MOTOR VEHICLE

CROSS-REFERENCE TO RELATED APPLICATIONS

This application claims foreign priority benefits under 35 U.S.C. § 119(a)-(d) to DE 10 2015 217 577.4 filed Sep. 15, 2015, which is hereby incorporated by reference in its entirety.

TECHNICAL FIELD

The disclosure relates to automatically adapting acceleration in a motor vehicle.

BACKGROUND

Adaptive cruise controllers which regulate the speed of the corresponding vehicle in such a way that a desired distance or distance range from a vehicle traveling ahead is maintained are known from the prior art. This significantly relieves the driver, who no longer has to carry out the corresponding braking steps and acceleration steps.

A system for automatically detecting road signs and may integrate the road sign detection into an adaptive cruise controller is known. Likewise, a system for automatically detecting road signs and setting an accelerator pedal sensitivity as a function of a detected speed limit is also known in the prior art.

The prior art also includes a motor vehicle having a camera system for automatically detecting road signs and having an adaptive cruise controller to which a setpoint speed can be predefined. If a speed limit which does not correspond to the setpoint speed is detected on the basis of a road sign, the adaptive cruise controller is switched off and, if appropriate, switched on again with a setpoint speed which has been updated to the speed limit.

A motor vehicle having an adaptive cruise controller and a system for automatically detecting and evaluating road signs is also known in the prior art. It is proposed that, when a section of road with a speed limit is traveled on, this speed limit is to limit in the upward direction the setpoint speed which is to determined by the adaptive cruise controller. This is intended to prevent the prescribed speed limit being exceeded within the scope of the distance control.

However, it is a disadvantage with this prior art that in this approach the predefined speed limit is given preference unilaterally over other factors, such as e.g. distance control and driving comfort.

SUMMARY

A method according to at least one embodiment automatically adapts acceleration in a motor vehicle. In this context, a detection device determines a speed limit which applies to a section of road. The motor vehicle may comprise the detection device. This speed limit can be predefined here either by a standard, for example the road traffic regulations or the like, or be a practical specification such as emerges from a current traffic situation or the profile of a route. In addition, a speed limit mode controller determines a cruise control setpoint acceleration on the basis of the speed limit. The motor vehicle preferably also comprises the speed limit mode controller. Any type of acceleration is to be understood here and below as also referring to a negative acceleration in the sense of deceleration. In various embodiments, an actuation device actuates a drive device of the motor vehicle on the basis of the cruise control setpoint acceleration with a drive setpoint acceleration. The motor vehicle comprises the actuation device and the drive device. The drive device acts on an engine and brakes of the motor vehicle to set the actual acceleration of the motor vehicle.

The method according to at least one embodiment is defined in that a cruise and follow mode controller determines a distance control setpoint acceleration on the basis of a detected vehicle distance from a vehicle traveling ahead, and in that the drive setpoint acceleration is limited by the distance control setpoint acceleration in such a way that the drive setpoint acceleration remains below the distance control setpoint acceleration. Such a vehicle which is traveling ahead is to be understood as being a further vehicle which has already traveled on the section of road, or is about to travel on the section of road, at a distance from the vehicle.

According to the disclosure it has thus been recognized that, rather than avoiding a speed specification by a road sign being exceeded, it is more important to prevent the desired speed which is predefined by means of the cruise controller leading to a situation in which the motor vehicle is strongly accelerated when this leads at the same time to a sudden decrease in the distance from the vehicle traveling ahead. As such, various embodiments are aimed at avoiding excessive acceleration values, in particular since these generally lead to reversed correction interventions, that is to say strong braking in response to excessively strong acceleration. This serves for comfort and for reducing the fuel consumption.

In one embodiment, the detection device determines a speed limit which applies for a section of road which is currently being traveled on by the motor vehicle. Alternatively or additionally, the detection device can determine a speed limit which applies to a section of road which is to be traveled on in the future within a field of vision of the motor vehicle. It may also be the case that this section of road which is to be traveled on in future is outside the field of vision of the motor vehicle. The term field of vision is to be understood here as referring not only to a distance but also to the presence of an obstacle-free line of sight.

A further embodiment is defined in that the detection device comprises a camera arrangement which visually acquires a route section information item to determine the speed limit. In this way, it is therefore possible to determine the route section information dynamically. Alternatively or additionally, the detection device can comprise a map processing device which reads out a route section information item from a map for the section of road to determine the speed limit. This map can be stored with the route section information item or with a plurality of route section information items in a map memory of the map processing device.

There is also provision that the map processing device estimates a route to be traveled on for the motor vehicle on the basis of a probability calculation, and the section of road lies on this estimated route. This probability calculation can be based, for example, on statistical information relating to the routes traveled by other motor vehicles in the past.

A refinement of the method according to one embodiment provides that the detection device comprises a radio device which, in order to determine the speed limit, receives in a wireless fashion a route section information item from a vehicle at a distance. Alternatively or additionally, the radio device can receive the route section information item in a wireless fashion from a stationary route section-mounted device.

In terms of the route section information item there is provision in various embodiments that the route section information item relates to the section of road and comprises a speed limit, a road sign, a traffic signal information item, a bend information item, a traffic situation information item and/or statistical speed data. On the one hand, such a speed limit can be present as such, in particular as a result of assignment by means of the above map. On the other hand, the speed limit can also result from the processing of a road sign. A traffic signal information item can be, for example, the state of a traffic light or some other traffic signal system. A bend information item can comprise, in particular, a measure of a bend radius or the like of the section of road. A traffic situation information item can comprise a statement about the number of vehicles on the section of road. The statistical speed data can comprise, for example, the average velocity of vehicles on the section of road which have been registered in the past and, if appropriate, over a relatively long time period.

The absence of a speed limit can also be understood to be a route section information item. It is therefore preferred that the route section information item relates to the section of road and comprises an identifier of the section of road as limit-free, and that the detection device determines a speed limit for the limit-free section of road, which speed limit has been stored for limit-free sections of road in a data memory. In this way, the driver can predefine, e.g. for sections of freeway without a speed limit, a desired speed which becomes effective whenever such a section is traveled on. This data memory can also be identical to the above map memory.

Taking this as the basis, the speed limit which is stored in the data memory can be set by means of an operator control interface of the motor vehicle and updated after setting in the data memory and that, after the ignition state of the motor vehicle is switched off, the speed limit which is stored in the data memory is reset to a starting value. This ensures that in the case of a change of driver, the setting which was made by an earlier driver is not adopted by a subsequent driver.

The connection of a trailer to the motor vehicle limits its driving behavior and it is also standardized with respect to the permissible speed. Therefore, in at least one embodiment the detection device has a sensor device for detecting a trailer which is connected to the motor vehicle, and adapts the speed limit when there is a trailer connected to the motor vehicle. The risk of an excessive speed of the motor vehicle with trailer is minimized thereby. The fact that a trailer is connected to the motor vehicle can alternatively or additionally also be detected on the basis of an electrical connection to the trailer and of the supply voltage of the motor vehicle for the trailer.

To take into account not only an effective speed limit but also the wishes of the driver with respect to the speed, embodiments may include a provision that the speed limit mode controller determines a cruise control setpoint speed on the basis of a driver's specification and determines the cruise control setpoint acceleration on the basis of the cruise control setpoint speed. In this way, the speed limit mode controller therefore takes into account both the driver's specification and the cruise control limit during the determination of the cruise control setpoint acceleration.

The expressed determination of the cruise control setpoint speed by the driver provides one such possible driver's specification. In one alternative, the driver's specification comprises a setpoint speed offset, and the cruise control setpoint speed is based on the setpoint speed offset and the speed limit. In this way, the driver can therefore specify that he desires a speed of the motor vehicle which is respectively an absolute value above or below the speed limit.

With respect to the cruise and follow mode controller, in at least one embodiment there is provision for determining the distance control setpoint acceleration in such a way that a setpoint minimum distance from the vehicle traveling ahead is maintained.

As a rule, actuation of the drive device of the motor vehicle occurs with a drive setpoint acceleration which is different from zero when a setpoint speed which can result from the speed limit and from the cruise and follow mode controller does not correspond to an actual speed of the motor vehicle. The greater the difference between the actual speed and setpoint speed, the larger the drive setpoint acceleration will also be. Nevertheless, it may be advantageous for the drive setpoint acceleration to provide a differentiated profile as merely "jumps". The speed limit mode controller determines the cruise control setpoint acceleration on the basis of an active setpoint acceleration profile, wherein the setpoint acceleration profile defines a setpoint acceleration profile plotted against the time. The setpoint acceleration is therefore not constant against the time—specifically with respect to the time in which a drive setpoint acceleration which is different from zero is actually applied—instead it has a change of profile.

The setpoint acceleration profile plotted against the time may provide, as the time progresses, an essentially asymptotic approximation to a maximum acceleration absolute value. An acceleration absolute value is to be understood here as the absolute value of the acceleration. In this way, jolting acceleration jumps are avoided and the maximum acceleration absolute value is limited.

Finally, the active setpoint acceleration profile may be determined from a multiplicity of stored setpoint acceleration profiles, wherein the determination of the active setpoint acceleration profile is based on a difference between the speed limit and the current actual speed of the vehicle, on the current actual speed of the motor vehicle, on the type of the road currently being traveled on by the motor vehicle and/or on an expected speed limit. A situation-dependent setpoint acceleration profile can be used accordingly.

Further features and advantages of one or more embodiments can be found in the following description of a representative embodiment which is not to be understood as restrictive and which is explained in more detail below with reference to the figures. In the drawing, in each case in a schematic form:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
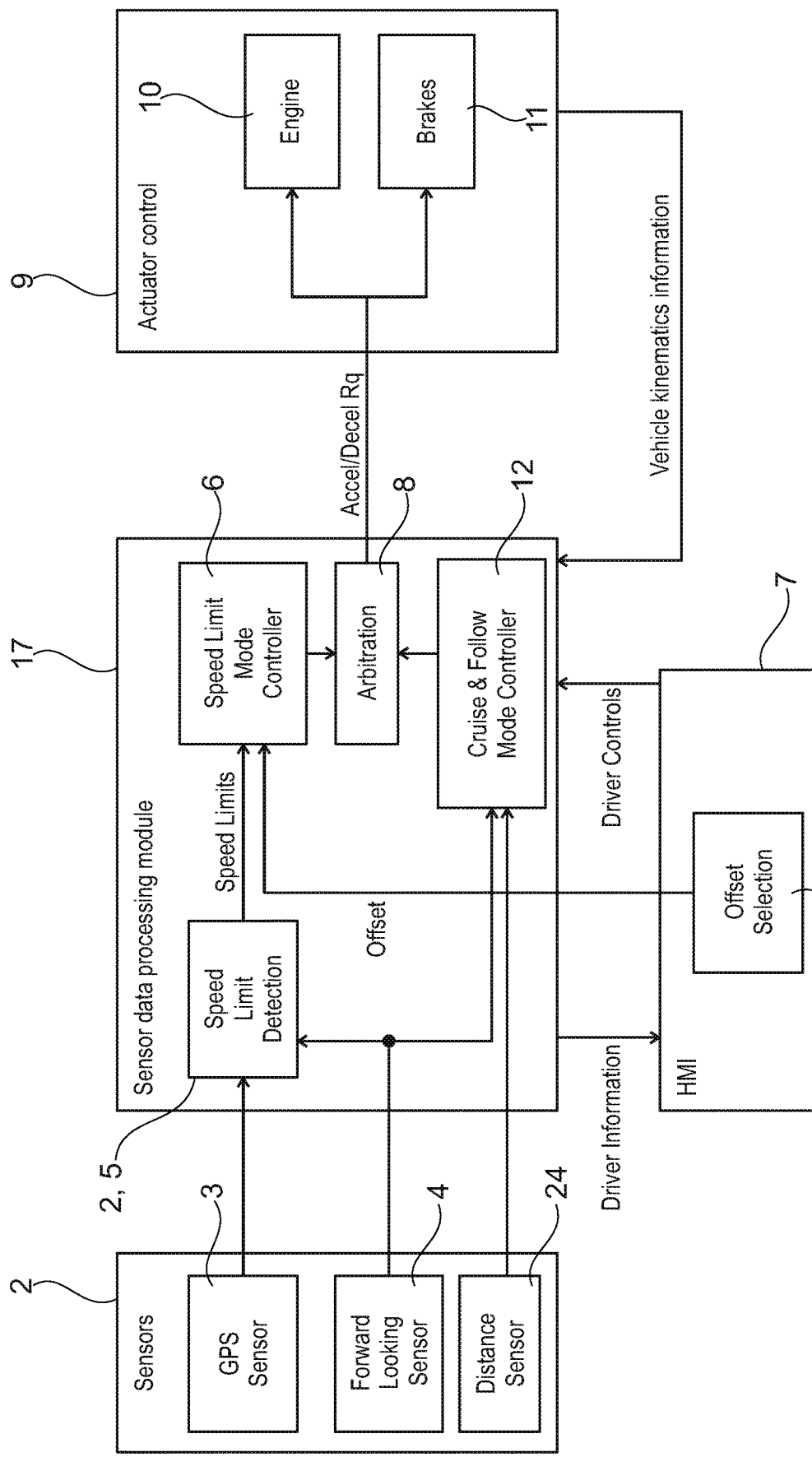
FIG. 1 shows a representative embodiment of an electronic system in a motor vehicle for carrying out a method according to the disclosure.
Figure 3:
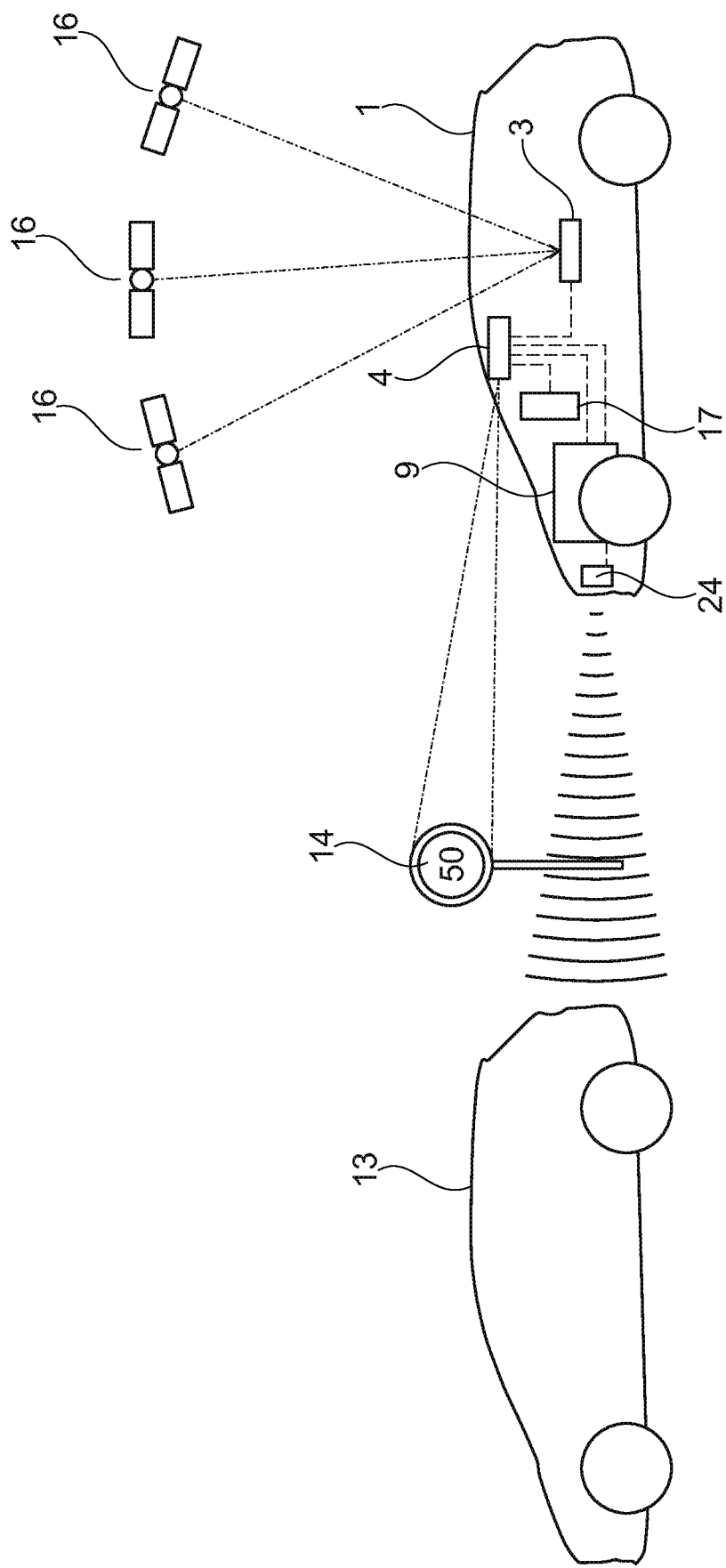
FIG. 3 shows a motor vehicle with the electronic system in FIG. 1 for carrying out a method according to the disclosure in a first driving situation.

The electronic system shown in FIG. 1 serves for automatically adapting acceleration in a motor vehicle 1. Such a motor vehicle 1 is respectively illustrated in FIGS. 3 and 4. A detection device 2 of the motor vehicle 1 has a position sensor 3, which is here a GPS receiver, a camera arrangement 4 which is directed forward in the direction of travel of the motor vehicle 1, and a logic unit which processes data received by the position sensor 3 and the camera arrangement 4. In this representative embodiment, the detection device 2 also comprises a distance sensor 24 for sensing a distance of the vehicle from a vehicle 13 traveling ahead, which vehicle is also illustrated in FIG. 3. In the present embodiment, the detection device 2 also comprises a logic unit which also functions as a map processing device 5 which has access to a map (not illustrated separately here) which is stored in a map memory or data memory and has various route section information items.

The electronic system also has a speed limit mode controller 6 which receives a speed limit from the detection device 2 and a driver's specification from an operator control interface 7. The driver's specification is composed here of an offset with respect to the speed limit, specifically in such a way that a speed of 5 km/h below the speed limit is predefined. Such a setpoint speed offset is input via an offset input 23 of the operator control interface 7 and can be either positive or negative with respect to the speed limit. The speed limit mode controller 6 outputs a cruise control setpoint acceleration to an actuation device 8, which in turn actuates a drive device 9 of the motor vehicle 1 with a drive setpoint acceleration. The drive device 9 can influence the acceleration and speed of the motor vehicle 1 by virtue of the fact that it directly accesses the engine 10 and the brakes 11 of the motor vehicle 1. Likewise, the speed limit mode controller 6 receives data relating to the vehicle kinematics from the drive device 9. If the detection device 2 is not able to determine a current speed limit either from the camera arrangement 4 or from the map processing device 5, the speed limit last determined may continue to be used.

In addition, the electronic system has a cruise and follow mode controller 12 which receives a vehicle distance, detected here by way of example by the distance sensor 24, from a vehicle 13 which is traveling ahead. In this representative embodiment, the logic unit and the map processing device 5 which is identical thereto here, the speed limit mode controller 6, the cruise and follow mode controller 12 and the actuation device 8 are formed by a processor device 17.

Both the above offset input 23 and the operator control interface 7 as a whole can be implemented for inputting by means of pushbutton keys on the steering wheel of the motor vehicle 1. With such pushbutton keys it is possible for the above electronic system to be switched between a quiescent state and an active state. In addition, the driver can override the electronic system by active intervention. This can be done both by means of the pushbutton keys and by means of the accelerator pedal or brake pedal of the motor vehicle 1. The electronic system optionally switches into the quiescent state after such an active intervention or returns into the state before the active intervention. The operator control interface 7 likewise has a graphic display of the currently determined speed limit and of the setpoint speed offset as well as a situation-dependent warning output at the changeover into the quiescent state of the electronic system.

A representative driving situation of the motor vehicle 1 for applying the method is illustrated in FIG. 3. On the basis thereof and of said data relating to the vehicle kinematics, which it also receives, the cruise and follow mode controller 12 determines a distance control setpoint acceleration which is transmitted to the actuation device 8. In the actuation device 8, the drive setpoint acceleration is then limited to the value of the distance control setpoint acceleration. This limitation can refer either to the signed acceleration or to an absolute value of the acceleration.

Figure 2:
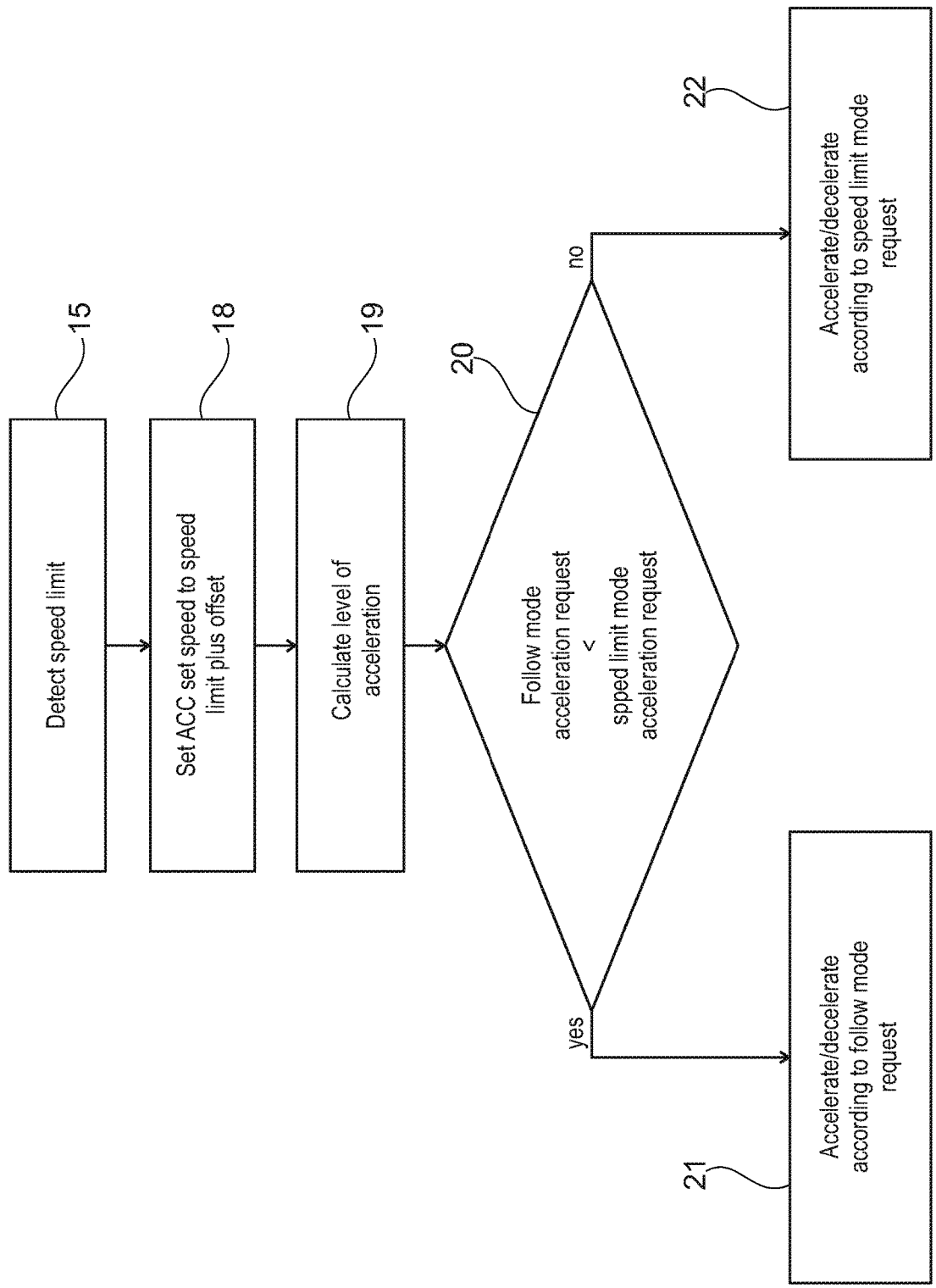
FIG. 2 shows a flowchart relating to a representative embodiment of a method according to the disclosure.

FIG. 2 shows a sequence such as can arise in the situation in FIG. 3. The camera arrangement 4 detects a road sign 14 and determines on the basis thereof a current applicable speed limit of 50 km/h in a detection step 15. Likewise, the position sensor 3, which receives position information from navigation satellites 16, would have been able to determine this speed limit by comparing this position information with a map which is stored in a map memory and has various route section information items.

The speed limit mode controller 6 of the processor device 17 sets a cruise control setpoint speed of 55 km/h in a speed step 18 on the basis of the speed limit which is determined in this way and a representative setpoint speed offset of 5 km/h according to a driver's specification. In the same step, the cruise and follow mode controller 12 which is also formed by the processor device 17 calculates a distance control setpoint speed. This calculation is based on the distance of the vehicle from the vehicle 13 traveling ahead, which vehicle distance has been detected by the distance sensor 24. On the basis of this distance control setpoint speed, the signed distance control setpoint acceleration is then calculated in the calculation step 19, and the likewise signed cruise control setpoint acceleration is calculated—this in turn on the basis of the above cruise control setpoint speed. In the following comparison step 20 it is then checked whether the cruise control setpoint acceleration is higher than the distance control setpoint acceleration. If this is the case, in a distance control step 21 the actuation device 8 actuates the drive device 9 according to the distance control setpoint acceleration. If, on the other hand, the distance control setpoint acceleration exceeds the cruise control setpoint acceleration, in a cruise control step 22 the actuation device 8 actuates the drive device 9 according to the cruise control setpoint acceleration.

Figure 5:
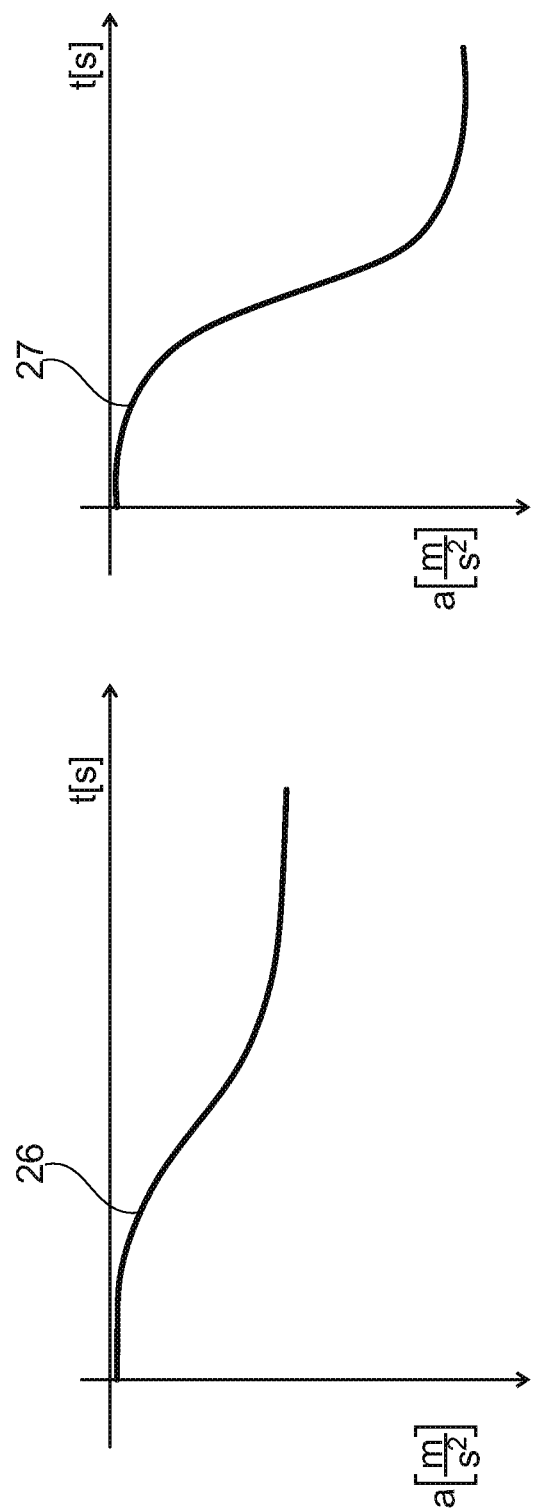
FIG. 5 shows a setpoint acceleration profile for use in a representative embodiment of a method according to the disclosure.

The calculation of the cruise control setpoint acceleration can then be based on a setpoint acceleration profile which defines a setpoint acceleration profile 26, 27 plotted against the time. For example, in FIG. 5 two such setpoint acceleration profiles 26, 27 are illustrated by way of example plotted against the time. Both setpoint acceleration profiles 26, 27 have in common the fact that the resulting cruise control setpoint acceleration assumes, starting from zero, an end value in the manner of an asymptotic approximation. The setpoint acceleration profile 26 applies here by way of example to a case of a small difference between the speed limit and the current actual speed of the motor vehicle 1 and a low current actual speed of the motor vehicle 1, whereas the setpoint acceleration profile 27 applies to the case of a relatively large difference between the speed limit and the current actual speed of the motor vehicle 1 as well as a relatively high current actual speed of the motor vehicle 1.

Figure 4:
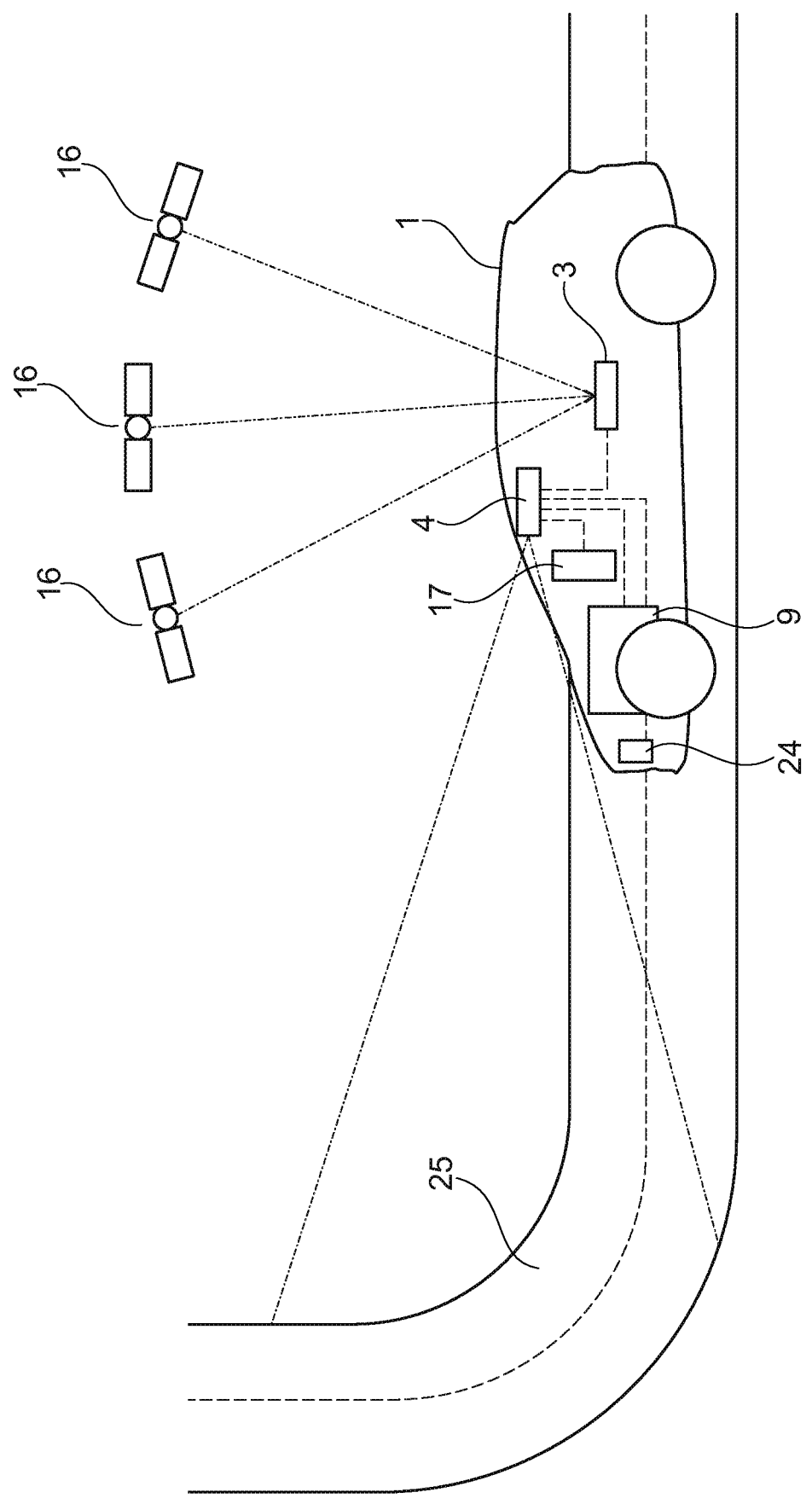
FIG. 4 shows the motor vehicle in FIG. 3 in a second driving situation.

Referring again to FIG. 3, instead of the detection of the road sign 14 by the camera arrangement 4 and the determination of the speed limit on the basis thereof, it is also possible that, according to the situation shown in FIG. 4, the camera arrangement 4 acquires a bend information item 25—that is to say an information item relating to the degree of curvature of a section of road to be traveled on, and determines a speed limit on the basis of this bend information item. In this case, it is therefore not a matter of a speed limit based on a standard but rather a speed limit which results from the driving properties of the motor vehicle 1 and the "difficulty" of the bend corresponding to the bend information item 25. Likewise, the position sensor 3, which receives position information from navigation satellites 16, would have been able to determine this speed limit by comparing this position information with a map which is stored in a map memory and has various route section information items.

It can be the case that a minimum speed below which the respective method of functioning is not provided, or provided only to a restricted degree, is predefined for the speed limit mode controller 6 and/or for the cruise & follow mode controller 12.

In a first representative scenario, the detection device 2 detects a speed limit which lies below a minimum speed. At the same time, there is no vehicle traveling ahead within the range of the cruise and follow mode controller 12. In this case, the speed limit mode controller 6 accelerates the motor vehicle 1 up to the minimum speed and then switches the electronic system into the quiescent state.

A second representative scenario corresponds to the above first scenario with the difference that, by virtue of a positive setpoint speed offset, the cruise control setpoint speed which is determined by the speed limit mode controller 6 is above the minimum speed. In this case, the electronic system remains active until the cruise control setpoint speed drops below the minimum speed, e.g. as a result of a reduction in the setpoint speed offset, wherein the same procedure as in the first scenario is then adopted.

In a third representative scenario, a vehicle 13 which is traveling ahead is present within range. Here, a differentiation is again made between whether the motor vehicle 1 has what is referred to as a "stop-and-go" functionality. This permits the cruise and follow mode controller 12 to regulate the distance of the motor vehicle 1 from the vehicle 13 traveling ahead without at the same time a minimum speed having to be maintained.

If the motor vehicle 1 therefore does not have a "stop-and-go" functionality in the third scenario, the electronic system is switched into the quiescent state as soon as the minimum speed is undershot on the basis of the cruise and follow mode controller 12. If the motor vehicle 1 has the "stop-and-go" functionality, the electronic system remains active as long as the vehicle 13 which is traveling ahead is within range of the distance sensor 24. The electronic system switches into the quiescent state only if the vehicle 13 which is traveling ahead moves outside the range of the distance sensor 24, e.g. as a result of a differing route or as a result of the speed limit being exceeded.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly illustrated or described.

What is claimed is:

1. A method for controlling a vehicle performed by a vehicle controller configured to execute program instructions, comprising:
automatically adapting vehicle acceleration controlled by the vehicle controller responsive to a cruise control setpoint acceleration associated with a speed limit detected by a detection device of the vehicle, and a drive setpoint acceleration based on the cruise control setpoint acceleration, wherein a cruise controller determines a distance control setpoint acceleration based on a detected vehicle distance from a vehicle traveling ahead, and wherein the drive setpoint acceleration is limited by the distance control setpoint acceleration.

2. The method of claim 1 wherein the detection device detects the speed limit that applies to a section of road on which the vehicle is currently traveling.

3. The method of claim 2 wherein the detection device comprises a camera system, the method further comprising acquiring a route section information item to detect the speed limit.

4. The method of claim 2 wherein the detection device comprises a map processing device that acquires a route section information item based on vehicle position to detect the speed limit.

5. The method of claim 1 wherein the detection device detects the speed limit that applies to a section of road in a field of vision of the detection device that is anticipated to be traveled on.

6. The method of claim 1 wherein a radio device receives a route section information item from a vehicle at a distance to determine the speed limit.

7. The method of claim 1 wherein detecting the speed limit comprises detecting the speed limit based on a route section information item relating to a section of road, the route section information comprising a speed limit sign, a road sign, a traffic signal information item, a bend information item, a traffic situation information item and/or statistical speed data.

8. The method of claim 1 further comprising in response to detecting a section of road associated with an unlimited speed, using a previously stored speed limit associated with unlimited speed road sections.

9. The method of claim 8 wherein the previously stored speed limit is stored in a data memory using an operator control interface of the vehicle and wherein the previously stored speed limit is reset after switching off the vehicle.

10. The method of claim 1 further comprising detecting a trailer connected to the vehicle, wherein the detected speed limit applies only to vehicles towing trailers.

11. The method of claim 1 further comprising determining a cruise control setpoint speed based on user input and wherein the cruise control setpoint acceleration is determined based on the cruise control setpoint speed.

12. The method of claim 11 wherein the user input comprises a setpoint speed offset and the cruise control setpoint speed is based on the setpoint speed offset and a cruise control limit.

13. The method of claim 1 further comprising determining the distance control setpoint acceleration to maintain a setpoint minimum distance from the vehicle traveling ahead.

14. The method of claim 1 wherein the cruise control setpoint acceleration is determined from a setpoint acceleration profile as a function of time.

15. The method as claimed in claim 14, wherein the setpoint acceleration profile is determined from a plurality of stored setpoint acceleration profiles with selection of an active setpoint acceleration profile based on a type of road being currently traveled on by the vehicle or based on an expected speed limit.

16. A vehicle comprising:
a speed limit detection device; and
a controller programmed to automatically adjust vehicle acceleration responsive to a cruise control setpoint acceleration associated with a speed limit detected by the detection device, a drive setpoint acceleration based on the cruise control setpoint acceleration, and a distance control setpoint acceleration based on a detected vehicle distance from a vehicle traveling ahead, wherein the drive setpoint acceleration is limited by the distance control setpoint acceleration.

17. The vehicle of claim 16 wherein the controller is further programmed to adjust the vehicle acceleration based on a selected one of a plurality of cruise control setpoint acceleration profiles.

18. The vehicle of claim 17 wherein an active cruise control setpoint acceleration profile is selected from the plurality of cruise control setpoint acceleration profiles based on a type of road currently being traveled upon by the vehicle.

19. A method for controlling a vehicle comprising:
detecting a speed limit using a vehicle camera or vehicle location relative to map-based speed limits; and
automatically controlling vehicle acceleration responsive to a cruise control acceleration setpoint associated with the speed limit, a drive acceleration setpoint based on the cruise control acceleration setpoint, and a distance control acceleration setpoint based on a selected vehicle following distance.

20. The method of claim 19 wherein automatically controlling comprises controlling the vehicle acceleration to follow one of a plurality of previously stored cruise control acceleration profiles selected in response to at least one of speed limit and road type.

* * * * *